June 24, 1969  A. T. HAYANY  3,452,302
COUPLING OF DIELECTRIC TO METALLIC WAVEGUIDES
Filed Jan. 9, 1967  Sheet 1 of 5

INVENTOR
A.T. HAYANY
BY Burton I. Levine
ATTORNEY

United States Patent Office 3,452,302
Patented June 24, 1969

3,452,302
COUPLING OF DIELECTRIC TO METALLIC WAVEGUIDES
Adnan T. Hayany, Kansas City, Mo., assignor to Western Electric Company Incorporated, New York, N.Y., a corporation of New York
Filed Jan. 9, 1967, Ser. No. 608,149
Int. Cl. H01p 1/16, 1/08; H03h 5/00
U.S. Cl. 333—21                                  17 Claims

ABSTRACT OF THE DISCLOSURE

An intermediate section of solid dielectric waveguide is matched at both ends to sections of hollow metallic waveguide with the aid of a new low-loss transition. A pair of substantially identical reflecting surfaces extend in longitudinal opposite directions along the dielectric section from opposite interfaces between the latter and the metallic waveguide sections. The transverse spacing of each reflecting surface from the dielectric section decreases monotonically with longitudinal distance from a maximum at the associated interface.

---

This invention relates to electromagnetic wave transmission system and, more particularly, to systems employing waveguide structures formed from solid dielectric material. Accordingly, it is a general object of the invention to provide new and improved systems of this character.

BACKGROUND OF THE INVENTION

It is well known that when cylinders formed from solid dielectric material are employed for guiding electromagnetic waves, the latter may have finite field components extending transversely from some distance beyond the interface between the periphery of the dielectric structure and the surrounding air. As a result, the effective cross-section, and thus the potential bandwidth, of such dielectric structures is greater than that of conductively bounded waveguides of the same transverse extent, in which wave energy is strictly confined by peripheral metallic boundaries.

The use of solid dielectric structures has thus far been limited, for the most part, to certain specialized applications such as end-fire dielectric rod antennas. Under proper circumstances, however, the use of solid dielectric structures in long distance electromagnetic wave transmission systems in place of the more conventional conductively bounded waveguides can result in (a) looser tolerances, (b) greater power handling capacity, and (c) relatively low loss per unit length, in addition to increased bandwidth. To this end, solid dielectric waveguide components such as filters, attenuators and directional couplers have been devised.

One difficulty inherent in the extensive use of such solid dielectric components for long distance guided wave transmission stems from the fact that conductively bounded circuit elements (such as metallic cavities) are almost universally employed in electromagnetic wave generating apparatus. As a result, means are necessary for coupling energy from the generator to the solid dielectric component. Moreover, as seems likely, the above-mentioned solid dielectric components will at least initially be employed in existing conductively bounded transmission lines on a selective replacement basis. Each such replacement requires a transition to and from the remaining conductively bounded components at the input and output, respectively, of the solid dielectric replacement component.

Unfortunately, existing coupling sections or transitions of this type have been generally unsatisfactory because of their failure to deal effectively with two factors that are simultaneously present in such circumstances: (a) the difference in characteristic impedance at each interface between the dielectric and metallic components, and (b) the tendency of the guided energy to radiate at each such interface. The latter tendency is caused by the relative difference in the phenomena of wave guidance in the two types of structures, as indicated above. The resulting transmission loss through such inefficient transitions (especially where large numbers of replacements are to be made in existing systems) can more than nullify the improved transmission characteristics theoretically obtainable by replacing the metallic components with solid dielectric structures. While this loss may be somewhat diminished by making the cross-section of the dielectric component large with respect to that of the adjacent metallic component, this solution is mechanically unwieldy, electrically unreliable, and extremely uneconomical for waveguide systems of significant length.

Another object of the invention, therefore, is to provide new and improved low-loss transitions between hollow conductively bounded waveguides and solid dielectric waveguides particularly where such waveguides are of substantially the same cross-section.

These and related objects are obtained in a first illustrative embodiment of the invention, which permits a marked increase in power transfer efficiency through a first section of solid dielectric waveguide disposed between and coupled to input and output conductively bounded waveguides of corresponding cross-section. A pair of transition sections are respectively interposed between the first section and the input and output waveguides. Each transition includes a region of said dielectric waveguide identical in material and transverse extent to the first section, and a longitudinally extending reflecting surface coupled to and transversely spaced from the associated dielectric region. The reflecting surface is so disposed that this spacing is a maximum at the junction of the transition and the adjacent conductively bounded guide, and decreases monotonically with longitudinal distance from such junction. Preferably, the respective reflectors are anti-symmetrically disposed on opposite sides of the longitudinal center line of the transition sections. The reflectors may be longitudinally spaced or, alternatively, may be longitudinally coextensive in which case the first section and the dielectric regions of the respective transition sections are merged into a single dielectric section disposed between the conductively bounded guides.

In a second illustrative embodiment of the invention, the output conductively bounded waveguide and the separate input and output transitions are eliminated. Instead, the first section directly abuts the input conductively bounded waveguide to form the output waveguide of the system. This arrangement utilizes a pair of reflectors that are symmetrically disposed on the opposite side of the center line of the first section. The radial spacing between each reflector and the first section decreases monotically from a maximum from a junction of the input conductively bounded waveguide and the first section.

The nature of the present invention and its various advantages and features are set forth more fully in the following detailed description of the above and other embodiments when taken in connection with the appended drawing, in which.

Figure 1:
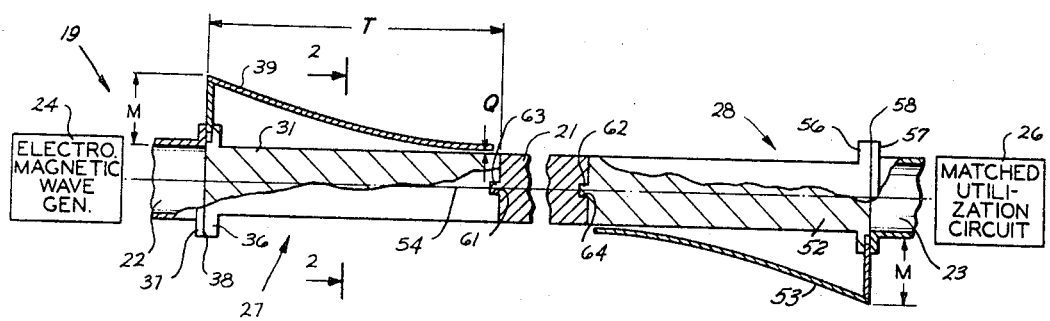
FIG. 1 is a side view, partly in section, of a rectangular waveguide transmission system incorporating a pair of transition sections according to the invention for matching an intermediate section of solid dielectric waveguide to a pair of conductively bound waveguides individually coupled to its input and output ends.

Referring in more detail to the drawing, FIG. 1 illustrates an electromagnetic wave transmission system 19 employing the present invention for the purpose of matching an intermediate section 21 of solid dielectric waveguide (illustratively polyethylene) to a pair of conductively bounded waveguide sections 22 and 23 coupled to its input and output ends, respectively. It will be assumed that all of the waveguide sections in the system 19 have identical transverse cross-sections and operate in the $TE_{10}$ mode, although it will be understood from the following description that other modes and cross-sections may be employed with appropriate modifications. For purposes of the following discussion, it will be assumed that the conductively bounded portions 22 and 23 are formed from hollow, thin walled sections of metallic tubing such as brass. The input waveguide 22 is coupled to a conventional electromagnetic wave generator 24 and the output waveguide 23 terminates in a matched utilization circuit 26.

It is well-known that when the metallic waveguides 22 and 23 and the intermediate dielectric section 21 are directly aligned end-to-end in an abutting relationship, a wave transmission path of varying impedance and loss characteristics results even where, as in this case, all the waveguides have substantially identical cross-sections.

One reason for this variation is the difference in dielectric constant between the air medium of the waveguides 22 and 23 and the solid dielectric medium of the section 21. This difference tends to cause impedance discontinuities (and therefore wave reflections) at the respective junctions of the waveguides 22 and 23 with the dielectric section 21.

A second reason for the varying loss characteristic of a directly abutting arrangement is the difference in wave constraint presented, on the one hand, by the conductive walls of the waveguides 22 and 23 and, on the other hand, by the dielectric boundary of the waveguide 21. Wave energy propagating in the waveguides 22 and 23 is essentially confined within the internal cross-section areas bounded by their conductive walls while energy guided by dielectric section 21 penetrates the latter's air-dielectric boundary for a finite radial distance. Because of this effect, a portion of the wave energy entering the section 21 from the input waveguide 22 tends to radiate toward the surrounding air in the vicinity of their junction. Moreover, a portion of the remaining energy guided along the dielectric air boundary of the waveguide 21 toward the output waveguide 23 will radiate the second time at the output junction for the same reason. Thus, the transmission path between the input and output waveguides 22 and 23 is ordinarily quite lossy.

In accordance with the invention, both the reflection and radiation losses of the system 19 caused by the above effects may be greatly diminished by incorporating a pair of substantially identical transition units 27 and 28 between the dielectric section 21 and the input and output sections 22 and 23, respectively. Each of the units 27 and 28 includes (a) an elongated region of solid dielectric substantially identical in material and cross-section to the section 21; and (b) at least one reflecting surface spaced from and extending along substantially the entire length of the associated dielectric region in such a manner that the distance from the reflecting surface to the adjacent wall of the dielectric region varies monotonically with longitudinal distance therealong.

Figure 2:
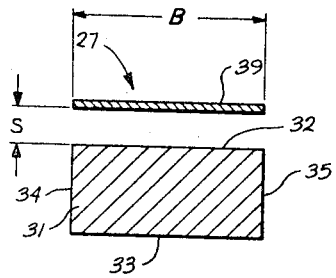
FIG. 2 is a cross-sectional view, taken along line 2—2 of FIG. 1, illustrating one of the transition sections.

Illustratively, the section 27 includes a solid polyethylene region 31 defined by a first pair of opposed wide walls 32 and 33 (FIG. 2) separated by a second pair of opposed narrow walls 34 and 35. The input of the section 27 is provided with a suitable dielectric flange 36 (FIG. 1) which is affixed by any convenient means to a metallic flange 37 mounted at the adjacent end of the waveguide 22 to form an input interface 38.

The transition section 27 further includes an elongated metallic reflecting surface 39 transversely spaced from and disposed above the dielectric region 31. In particular, the surface 39 may be in the form of a curved plate which at every point along its length has a flat transverse projection B (FIG. 2) that is parallel to the wide wall 32 of the region 31. The longitudinal extent T (FIG. 1) of the reflecting surface 39 (and thus the approximate length of the section 27) is preferably equal to an odd number of quarter wave lengths in the region 31 at a mean frequency of operation.

Figure 3:
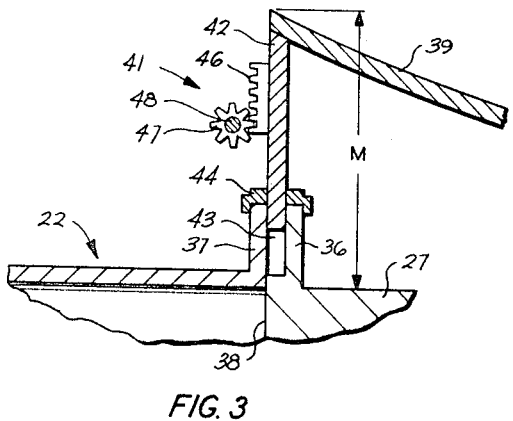
FIG. 3 is a detailed view of a height adjusting mechanism suitable for use with each transition of FIG. 1.

The reflecting surface 39 is spaced from the adjacent wall 32 of the region 31 by a variable radial distance S that decreases continually from a maximum spacing M at the input interface 38 to a minimum spacing Q at a point near the output end of the section 27. The distance Q, while small, is preferably made greater than zero so that the reflecting surface 39 does not contact the wall 32. (Typical values of the distance Q may vary from ½ inch at a mean frequency of 3500 mc. to ¹⁄₁₆ inch at a mean frequency of 5500 mc.) The distance M may be conveniently made adjustable (to assure maximum power transfer under varying conditions of operation) with a use of a height adjusting mechanism 41 (FIG. 3) that includes a radially disposed metallic plate 42. The input end of the reflecting surface 39 is affixed to the top of the plate 42. The plate 42 is mounted for radial movement within a recess 43 cut in the dielectric flange 36. The plate 42 extends into the recess 43 through a guide structure 44 which is affixed to the outer portions of the flanges 36 and 37. The distance M may be adjusted by relatively raising or lowering the plate 42 by any suitable means. One such means may include a rack 46 affixed to the input side of the plate 42, and a mating pinion 47 that is mounted for rotation on a transversely disposed shaft 48 and driven by a conventional mechanism (not shown).

Figure 4:
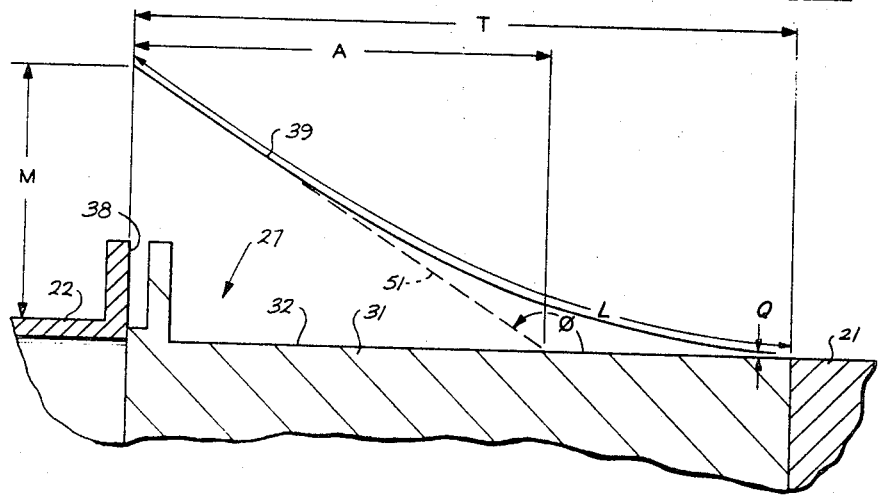
FIG. 4 is an enlarged view, partly in diagrammatic form, showing certain details of a reflector suitable for use in the transition section of FIG. 1.

The entire longitudinal contour L of the reflecting surface 39 may be linear. Preferably, however, at least a portion of the surface 39 has a convex contour whose slope with respect to the adjacent wall 32 (FIG. 2) decreases continually to a minimum at the output of the section 31. As shown in the expanded view of FIG. 4, the reflecting surface 39 may follow a contour that essentially coincides with a tangent line 51 for a longitudinal distance A from the input interface 38 and then deviates therefrom in a convex arc for the remaining distance to the output of the section 27. In the arrangement of FIG. 4, the tangent line 51 makes an angle θ with the top wall 32 of the region 31.

Referring again to FIG. 1, the output transition section 28 is similarly provided with a dielectric region 52 and with an associated second reflecting surface 53 disposed adjacent the bottom surface of the region 52. As shown, the surface 53 is located in generally antisymmetrical relationship to the reflecting surface 39 of the transition 27 with respect to a longitudinal center line 54 of the transition section 28. For purposes of this description, the quantities A', B', L', M', Q' S' and θ are assigned to the parameters of the reflector 53 to correspond to the similar non-primed parameters described above in connection with the reflector 39.

In a manner similar to that described in connection with the transition 27, the radial distance S' from the reflecting surface 53 to the bottom surface of the dielectric region 52 decreases monotonically from the maximum distance M' at the junction of the transition 28 and the output waveguide 23 to the minimum distance Q' at the opposite end of the section 28.

The output of the section 28 is provided with a dielectric flange 56 which is affixed by any convenient means to a metallic flange 57 mounted at the adjacent end of the output waveguide 23 to form an output interface 58. A second height adjusting mechanism (not shown) which may be similar to but operated independently of the height adjusting mechanism 41 at the input interface 38, may be employed at the output interface 58 for adjusting the spacing M'.

The ends of the transition section 27 and 28 that respectively abut the main dielectric section 21 are provided with tongue and groove regions 61 and 62, which individually interlock with a pair of complementary regions 63 and 64 at the input and output ends of the section 21. The use of such interlocking joints between solid dielectric guides of similar cross-section has been found to be preferable, from a matching and power transfer standpoint, to the use of mated dielectric flanges. It will also be understood, however, that the three individual dielectric sections 21, 31 and 52 which are of the same material and cross-section may instead be merged into one section between the input and output guides 22 and 23, thereby eliminating the necessity of intermediate dielectric flanges or interlocks altogether.

Figure 5A:
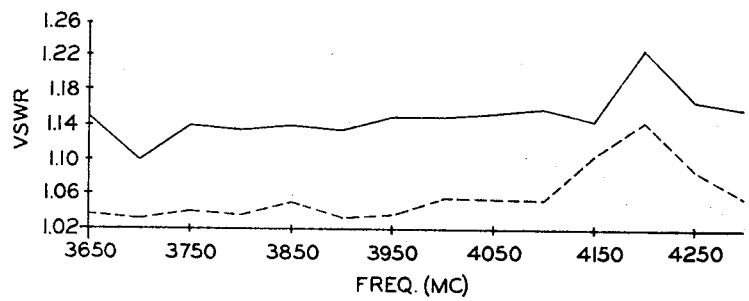
FIGS. 5A and 5B are a set of curves showing the improvement in VSWR and insertion loss obtainable in the system of FIG. 1 with the use of the transition sections.
Figure 5B:
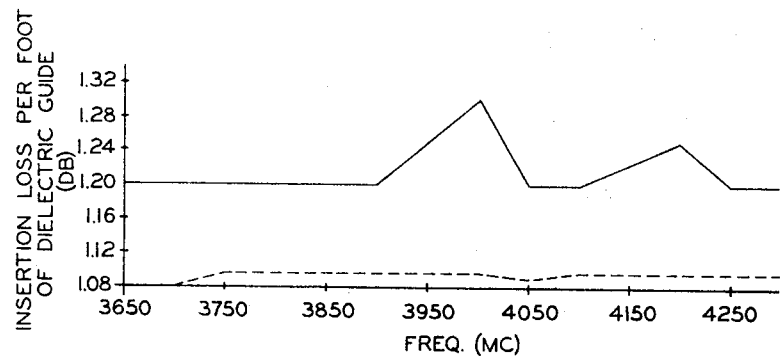
Figure 6A:
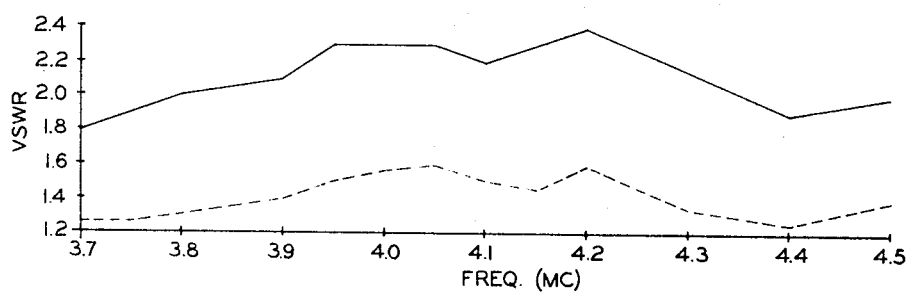
FIGS. 6A and 6B are a set of curves illustrating the relative improvement in VSWR and insertion loss obtainable with the use of the transition sections of FIG. 1 when a circular dielectric rod is substituted for the intermediate dielectric section.
Figure 6B:
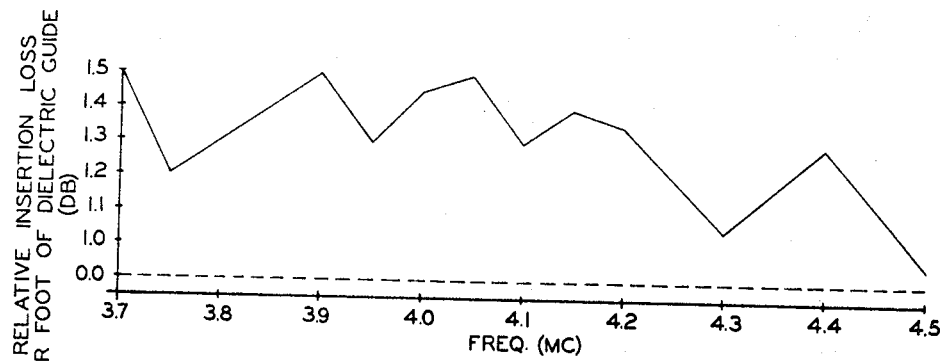

Without in any way limiting the generality of the foregoing description, FIGS. 5A and 5B depict a typical improvement in VSWR and insertion loss between the input and output interfaces 38 and 55 obtainable with the matching sections 27 and 28. In the illustrative embodiment employed to obtain the data of FIGS. 5A and 5B, each of the hollow metallic and dielectric sections had a cross-section of 2.290 by 1.145 inches, and the reflecting surfaces were designed as follows for operation in the 3600–4300 mc. band: $A=5\frac{3}{8}''$; $B=2''$; $L=7\frac{3}{8}''$; $M=2\frac{9}{16}''$; $Q=\frac{1}{4}''$; $T=7\frac{3}{8}''$ and; $\theta=160°$. An additional advantage of the general arrangement in FIG. 1 is that it provides an improved transmission characteristic even where the solid dielectric and hollow metallic waveguides have different cross-sectional shapes. Thus, if a single round polyethylene rod (not shown) is substituted for the dielectric sections 21, 31 and 52 of FIG. 1, the resulting large mismatches at the input and output interfaces are largely compensated with the use of a pair of antisymmetrically disposed reflectors (not shown) similar to the reflectors 39 and 53. For example, FIGS. 6A and 6B depict a typical improvement in VSWR and relative insertion loss provided by such reflectors when the rectangular section 21 (FIG. 1) of 2.290" by 1.145" cross-section is replaced by a 1" solid dielectric rod.

Figure 7:
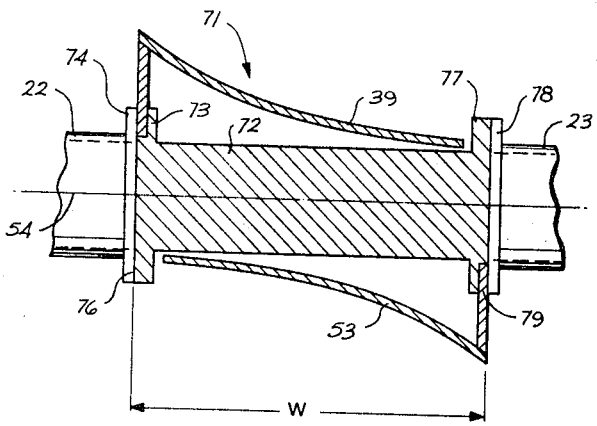
FIG. 7 is a side view, partly in section, of a system similar to FIG. 1 in which the intermediate dielectric waveguide and the dielectric waveguide of the several transitions are merged into a single unit, and the transition reflectors are made coextensive.

An alternative form of the invention is shown in FIG. 7. In this case, the input and output sections 27 and 28 have been telescoped into a common transition section 71. In this arrangement, in which elements corresponding to those of FIG. 1 have been given corresponding reference numerals, the input waveguide 22 is coupled to a common dielectric region 72 of the transition 71 by means of a first pair of flanges 73 and 74 individually affixed to the respective sections, thereby forming an input interface 76. In like manner, the dielectric region 72 is coupled to the output waveguide 23 by means of a second pair of flanges 77 and 78 individually affixed thereto to form an output interface 79. The length W of the transition section 71 is preferably made an odd number of quarter wave lengths in the region 72 at a mean frequency of operation. In this arrangement, the upper and lower reflecting surface 39 and 53 are longitudinally coextensive, as well as antisymmetrically disposed with respect to the longitudnial center line 54.

Figure 8A:
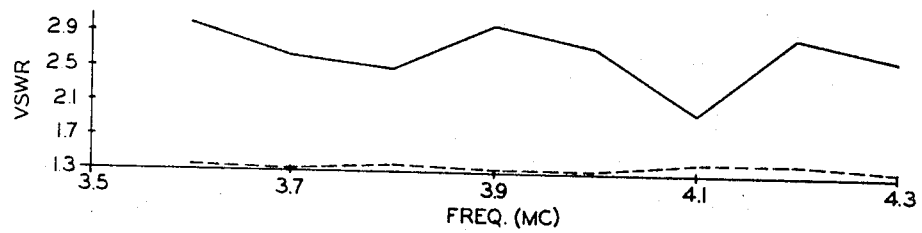
FIGS. 8A and 8B are a set of curves showing the improvement in VSWR and insertion loss obtainable with the arrangement of reflectors illustrated in FIG. 7.
Figure 8B:
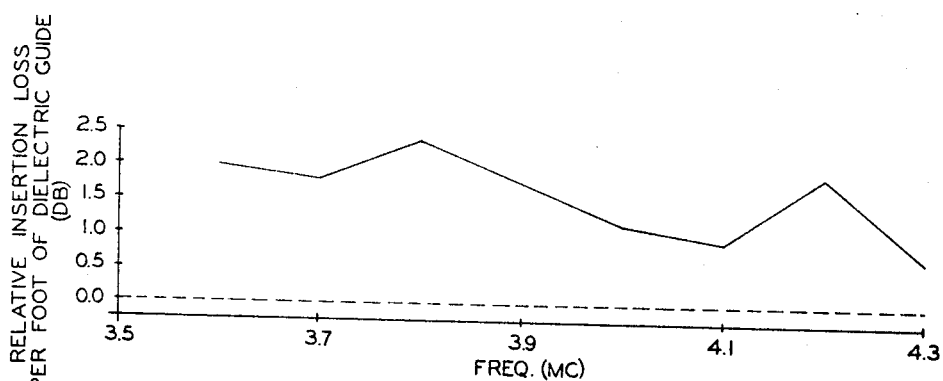

FIGS. 8A and 8B respectively show the improvement in VSWR and insertion loss obtainable with the transition section 71 of FIG. 7 when the reflectors 39 and 53 are employed as shown. In this case, all parameters are the same as those associated with FIGS. 5A and 5B except that the length W of the region 72 is equal to that of only one of the transition sections 27 and 28 of FIG. 1, i.e., $W=T=7\frac{3}{8}$.

Although the solid dielectric section 72 of FIG. 7 has been assumed to be homogeneous section of polyethylene, the section 72 may also take the form of a suitable solid dielectric component such as a filter or attenuator. When this is done, the scheme of FIG. 7 provides a compact low-loss assembly which can be directly substituted for a corresponding circuit element in a conductively bounded hollow waveguide.

Figure 9:
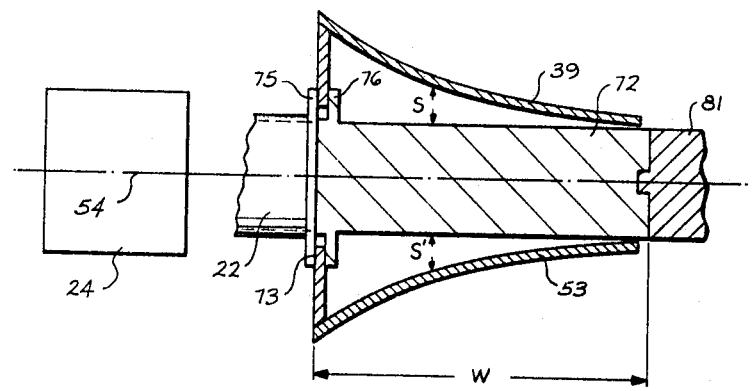
FIG. 9 is a side view, partly in section, of a system similar to that of FIG. 7, but employing an alternative arrangement of the reflectors, the system being terminated by a run of dielectric waveguide rather than a section of conductively bounded waveguide.

A modified form of the arrangement of FIG. 7 is shown in FIG. 9. In this embodiment the metallic output waveguide 23 has been replaced with a corresponding run 81 of dielectric waveguide of the same material and cross-section as the region 72, so that no impedance discontinuities exists at the junction therebetween. As shown, the waveguide 81 is interlockingly connected to the dielectric section 72, rather than flanged thereto, for the reasons discussed above. Moreover, in contrast to FIG. 7, the lower reflector 53 is disposed in generally symmetrical relation to the upper reflector 39 with respect to the longitudinal center line 54. Thus, the distances S and S' decrease continually with longitudinal distance from the input interface 73 to a point near the junction of the waveguides 72 and 81. Preferably, the distance W in this case is about 1½ wavelengths in the region 72 at a mean frequency of operation. A pair of individually controlled height adjusting devices (not shown) similar to the mechanism 41 in FIG. 3 may be provided at the input interface 73 on radially opposite sides of the flanges 75 and 76. The operation of this embodiment is similar to that of FIGS. 1 and 7.

Figure 10:
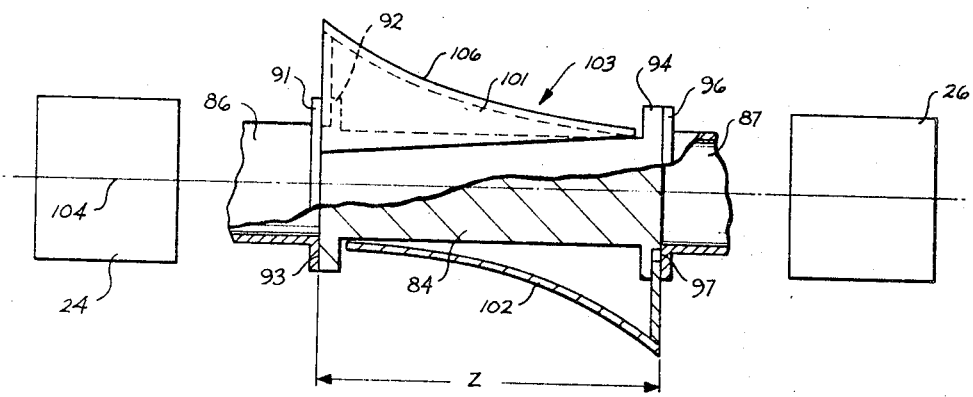
FIG. 10 is a side view, partly in section, of a system similar to FIG. 7 but formed from circular waveguide.

Another modification of the arrangement in FIG. 7 is shown in FIG. 10. This illustrates an embodiment of the invention in a circular waveguide transmission system 83 operating in the $TE_{11}$ mode. The system 83 is assumed to be formed from conductively bounded hollow waveguide except for an intermediate section 84 of solid dielectric waveguide of substantially identical cross-sections to the metallic guide. The metallic portions on the input and output sides of dielectric section 84 are identified as the "input waveguide 86" and the "output waveguide 87," respectively.

The input waveguide 86 is coupled to the generator 24 and the output waveguide 87 terminates in the matched utilization circuit 26.

The input waveguide 86 is provided at its output end with a suitable metallic flange 91, which is affixed by any convenient means to a dielectric flange 92 mounted on the dielectric section 84 to form an input interface 93. The section 84 is is also provided with a second dielectric flange 94, which is affixed to a metallic flange 96 on the output waveguide 87 to form an output interface 97.

A pair of elongated reflecting surfaces 101 and 102 are associated with and respectively located above and below the dielectric section 84 to form a transition 103. The reflectors 101 and 102 are antisymmetrically disposed with respect to a center line 104 of the system 83.

The upper reflector 101 extends longitudinally for a distance Z from the input interface 93 to a point in the vicinity of the output interface 97. Preferably, the distance Z is equal to an odd number of quarter wavelengths in the section 84.

By analogy to FIGS. 1 and 7, a longitudinal center line 10 (FIGS. 10 and 11) of the upper reflector 101 is radially spaced from the adjacent portion of the dielectric section 84 by a variable distance which diminishes continually as a function of length along the dielectric section 84 from a maximum distance at the interface 93 to a minimum distance at the other end of the section.

Figure 11:
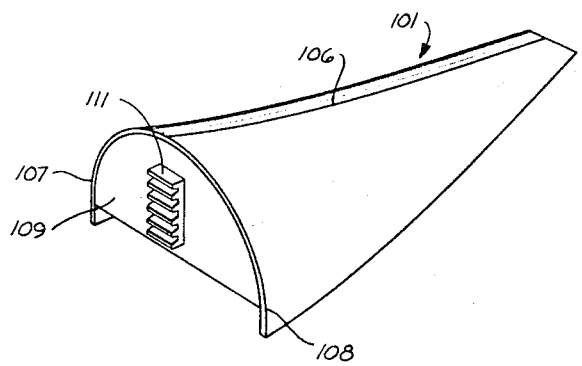
FIG. 11 is a perspective view of a typical reflector employed in the arrangement of FIG. 10.

The reflector 101 may be longitudinally straight or, alternatively, may be curved over a portion of its length in a manner similar to the reflectors 39 and 53 of FIG. 1. The reflector 101 is also transversely curved. As shown in FIG. 11, for instance, a pair of convex arcuate portions 107 and 108 respectively extend on either side of the center line 106 for a predetermined angular extent in each transverse cross-section of the reflector 101. Illustratively, the overall transverse extent of the portions 107 and 108 defines a semicircle in the transverse plane that is coincident with the input interface 93 and defines successively similar arcs in transverse planes located at increasing longitudinal distances along the dielectric section 84.

In order to facilitate the adjustment of the maximum distance of the reflector 101 from the section 84, a height adjusting plate 109 is affixed to the input end of the reflector 101, and a gear rack 111 is mounted on the external portion of the plate 109. The elements 109 and 111 may be similar to corresponding parts of the height adjusting mechanism 41 of FIG. 3.

The lower reflector 102 (FIG. 10) may be identical to the reflector 101, and the operation of FIG. 10 is essentially the same as that of FIG. 7.

It will be understood that by analogy to FIG. 9, the output conductive waveguide 87 of FIG. 10 may be replaced by a corresponding run (not shown) of solid dielectric waveguide of identical shape and material to that of the section 84. In such a case, the reflectors 101 and 102 may be disposed in generally symmetrical relation on the opposite sides of the longitudinal axis 104 of the system 83, and the length Z should preferably be 1½ wavelengths in the section 84 at a mean frequency of operation.

It is to be further understood that the above-described embodiments are merely illustrative of the principles of the invention, and that various modifications may be made from the specific details described without departing from the spirit and scope of the invention.

What is claimed is:

1. In an electromagnetic wave transmission system including a solid dielectric waveguide section longitudinally coupled to a hollow, conductively bounded waveguide section, apparatus for increasing the efficiency of wave transmission between the hollow section and the dielectric section, which comprises:
a first longitudinally extending reflecting surface; and means for associating the first surface with the dielectric section such that the first surface is coupled to but transversely spaced from the dielectric section, the spacing being a maximum at the junction of the hollow section and the dielectric section and decreasing monotonically with longitudinal distance from the junction.

2. A system as defined in claim 1, in which the spacing varies linearly with longitudinal distance from the junction.

3. A system as defined in claim 1, in which the transverse spacing varies non-linearly with longitudinal distance from the junction in such a manner that the first surface defines a longitudinally curved region.

4. A system as defined in claim 1, further comprising means for adjusting the maximum transverse spacing of the first surface from the dielectric section.

5. A system as defined in claim 1, further comprising a second reflecting surface substantially identical to and disposed on the transversely opposite side of the dielectric section from the first surface, the spacing of the second surface from the dielectric section varying monotonically along the dielectric section.

6. A system as defined in claim 5, in which the first and second surfaces are longitudinally coextensive.

7. A system as defined in claim 6, in which the first and second reflecting surfaces are symmetriaclly disposed with respect to the longitudinal center line of the dielectric section.

8. A system as defined in claim 5, further comprising means for individually adjusting the maximum separation of the first and second surfaces from the adjacent portions of the dielectric section.

9. In an electromagnetic wave transmission system including a first solid dielectric wavelength guide interconnecting second and third conductively bounded hollow waveguide sections, apparatus for reducing transmission loss between the second and third hollow sections caused by the presence of the first section, which comprises:
first and second substantially identical, coextensive, longitudinally extending reflecting surfaces respectively coupled to and transversely spaced from the the first section, the surfaces being disposed in generally symmetrical relationship on transversely opposite sides of the longitudinal center line of the first section, the spacing of each of the surfaces from the first section decreasing monotonically with longitudinal distance from a maximum value at the junction of the second hollow section and the first section.

10. In an electromagnetic wave transmission system including a first solid dielectric waveguide section interconnecting second and third conductively bounded hollow waveguide section, apparatus for reducing transmission loss between the second and third hollow sections caused by the presence of the first section, which comprises:
first and second substantially identical, longitudinally extending surfaces respectively coupled to and transversely spaced from the first section, the surfaces being disposed in generally antisymmetrical relationship on transversely opposite sides of the longitudinal center line of the first section, the spacing of the first surface from the first section decreasing monotonically with longitudinal disance along the first section from the junction thereof with the second hollow section, the spacing of the second surface from the first section decreasing monotonically with longitudinal distance along the first section from the junction thereof with the third hollow section.

11. A system as defined in claim 10, in which the first and second surfaces each extend over substantially the entire length of the first section.

12. A system as defined in claim 10, in which the ends of the first and second surfaces remote from the associated junctions terminate at different transverse planes to define an intermediate reflector-free region of the first section.

13. A system as defined in claim 10, further comprising means for individually adjusting the maximum transverse spacing of each of the first and second surfaces from the first section at the corresponding junctions thereof with the second and third hollow sections.

14. A system as claimed in claim 10 in which the cross-sections of the second and third hollow sections are rectangular, and the cross-section of the first section is circular.

15. A system as defined in claim 10, in which the second and third hollow sections and the first section have substantially identical cross-sections.

16. A system as defined in claim 15, in which the identical cross-sections are circular, the first and second surfaces being transversely curved to conform to and generally surround a portion of the circular periphery of the first section.

17. A system as defined in claim 15, in which the identical cross-sections are rectangular.

References Cited

UNITED STATES PATENTS 2,794,959  6/1957  Fox _____ 333—33 XR
2,867,776  1/1959  Wilkinson _____ 333—21

HERMAN KARL SAALBACH, *Primary Examiner.*
M. NUSSBAUM, *Assistant Examiner.*

U.S. Cl. X.R.
333—34